United States Patent [19]

Steigerwald et al.

[11] Patent Number: 4,825,348
[45] Date of Patent: Apr. 25, 1989

[54] RESONANT POWER CONVERTER WITH CURRENT SHARING AMONG MULTIPLE TRANSFORMERS

[75] Inventors: Robert L. Steigerwald, Burnt Hills; Andrew J. Macdonald, Ballston Spa, both of N.Y.

[73] Assignee: General Electric Company, Schenectady, N.Y.

[21] Appl. No.: 140,377

[22] Filed: Jan. 4, 1988

[51] Int. Cl.$^4$ ............................................. H02M 3/335
[52] U.S. Cl. ...................................... 363/17; 363/67; 363/132
[58] Field of Search ................... 363/17, 132, 67, 70, 363/98, 15, 16, 24, 131, 133

[56] References Cited

U.S. PATENT DOCUMENTS

| | | | |
|---|---|---|---|
| 4,128,866 | 12/1978 | Doerre | 363/15 |
| 4,204,147 | 5/1980 | Larrabee | 363/17 |
| 4,347,560 | 8/1982 | Seiersan | 363/24 |
| 4,591,964 | 5/1986 | Kemstedt | 363/24 |
| 4,618,919 | 10/1986 | Martin | 363/16 |
| 4,661,897 | 4/1987 | Pitel | 363/98 |
| 4,685,039 | 8/1987 | Inou et al. | 363/16 |
| 4,695,933 | 9/1987 | Nguyen et al. | 363/98 |
| 4,717,889 | 1/1988 | Engelmann | 363/17 |
| 4,761,727 | 8/1988 | Kammiller | 363/17 |

Primary Examiner—Patrick R. Salce
Assistant Examiner—J. Sterrett
Attorney, Agent, or Firm—Geoffrey H. Krauss; James C. Davis, Jr.; Marvin Snyder

[57] ABSTRACT

A resonant power converter has a plurality of transformers, each having a primary winding and a secondary winding coupled thereto; the primary windings of all of the plurality of transformers are connected in series. The plurality of transformer secondary circuits are effectively connected in parallel, for current addition. a relatively small portion of the resonance capacitor is placed across each primary winding to insure a low impedance which causes the secondary-winding-connected rectifiers to commutatively switch substantially independently and share the entire output current substantially equally. A plurality of lower power transformers are thus utilized to replace a single high power transformer, so that leakage inductance is reduced and a higher operating frequency can be maintained.

12 Claims, 2 Drawing Sheets

RESONANT POWER CONVERTER WITH CURRENT SHARING AMONG MULTIPLE TRANSFORMERS

BACKGROUND OF THE INVENTION

The present invention relates to high-frequency, high-power resonant converters, and more particularly, to a novel resonant power converter having a plurality of power transformers with insured current sharing therebetween.

It is highly desirable to provide DC—DC power converters with high efficiency and high power density, which typically requires that a relatively high switching frequency be utilized. The use of high switching frequencies, typically on the order of 100-500 Khz., is relatively easy to attain with relatively low power converters, but is relatively difficult to obtain when a single high-power transformer is driven. This is so because, as the output power required of a power converter is increased, the size and the leakage inductance of the output transformer increases. The output transformer volume varies with the output power in accordance with the relationship $(V1/V2) = (P1/P2)^{\frac{3}{4}}$, where $V1$ or $V2$ is the respective transformer volume at respective first or second power level $P1$ or $P2$; the transformer leakage inductance varies substantially linearly with dimension and, therefore, with power rating. From the foregoing relationships, along with the fact that volume varies as the cube of dimension, one can derive that transformer leakage inductance L, as a function of power rating P, is given by $(L1/L2) = (P1/P2)^{1.74}$ and where L2 are the respective leakage inductances for transformers having respective power ratings P1 and P2. Because the resonant converter output voltage must be reduced by an amount proportional to leakage inductance and output current, the available output voltage will decrease as the converter power rating is increased, if all other factors are held equal. To maintain the same output power, additional voltage and current stresses on the solid state components will be required, if the same frequency is maintained. In practice, therefore, the frequency is usually lowered as the power rating of the converter is increased, to offset the effect of the larger transformer, while simultaneously reducing high frequency losses in the larger transformer conductors. Additionally, higher output current has often been achieved by paralleling diodes, introducing current sharing and thermal runaway problems in the diodes as well as the necessity for selecting diodes with matched characteristics. It is highly desirable to provide a resonant power converter in which a high operating frequency is maintained even while the power level increases, and to allow mismatched secondary rectifiers to be utilized for current sharing in such increased-power-rating resonant power converters.

BRIEF SUMMARY OF THE INVENTION

In accordance with the invention, a resonant power converter has a plurality of transformers, each having a primary winding and a secondary winding coupled thereto; the primary windings of all of the plurality of transformers are connected in series. The plurality of transformer secondary circuits are effectively connected in parallel, for current addition. A relatively small portion of the resonance capacitor is placed across each primary winding to insure a low impedance which causes the secondary-winding-connected rectifiers to commutatively switch substantially independently and share the entire output current substantially equally. A plurality of lower power transformers are thus utilized to replace a single high power transformer, so that leakage inductance is reduced and a higher operating frequency can be maintained.

In one presently preferred embodiment, a pair of transformer primary windings are series-connected in a series/parallel-resonant converter placed in a full bridge switching circuit. The parallel-connected outputs from the rectified secondary windings of the transformers provide the total supply output current.

Accordingly, it is a object of the present invention to provide a novel resonant power converter having a multiplicity of transformers with current sharing in the primary windings thereof.

This and other objects of the present invention will become apparent upon a reading of the following detailed description, when considered in conjunction with the drawings.

DETAILED DESCRIPTION OF THE INVENTION

Figure 1A:
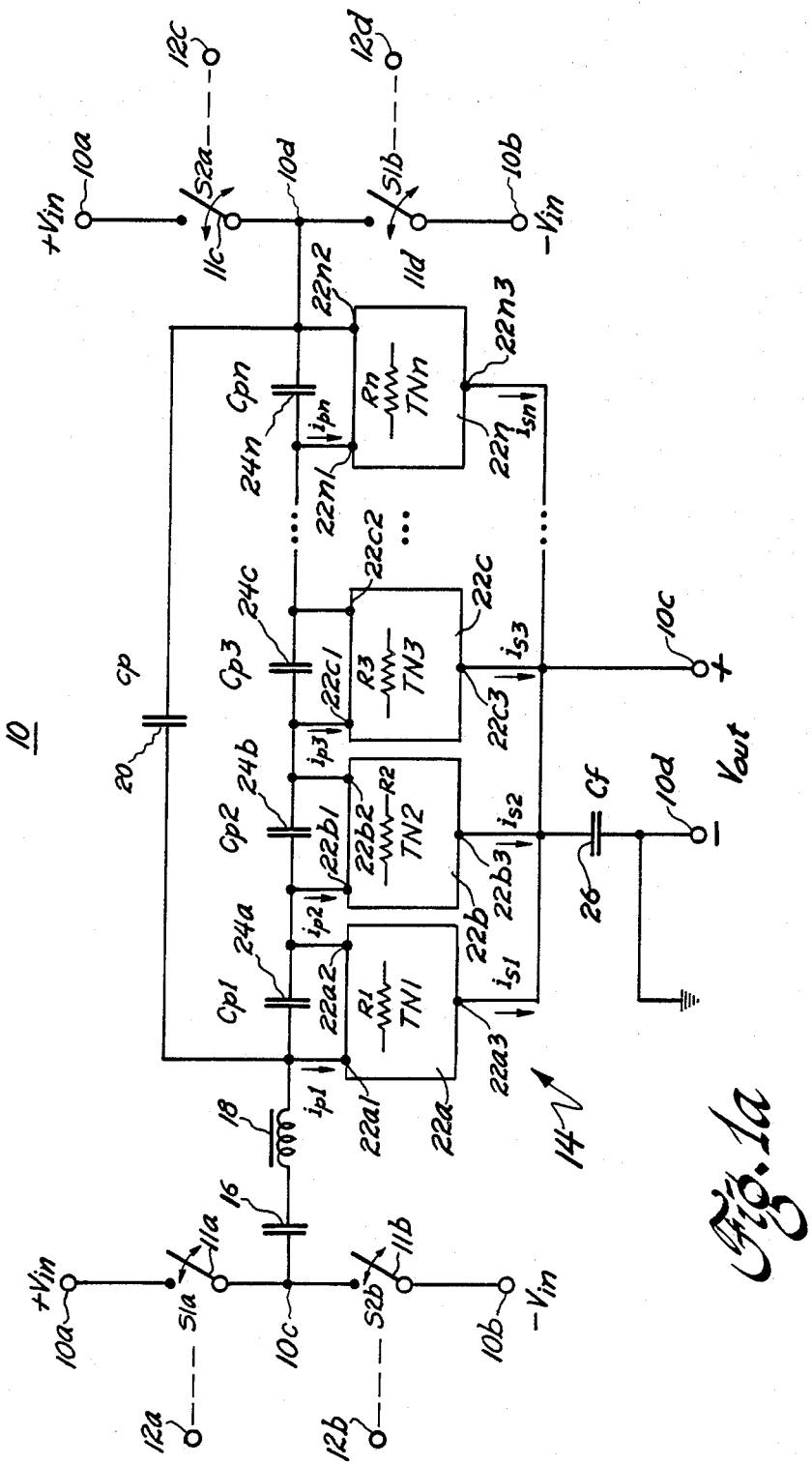
FIG. 1a is a schematic block diagram of a generalized resonant power converter, in accordance with the principles of the present invention.

Referring initially to FIG. 1a, resonant power converter 10 utilizes a full bridge circuit comprised of four controlled power switching means 11a–11d, connected between $+V_{in}$ DC input terminals 10a and $-V_{in}$ DC voltage input terminals 10b. A first controlled switch means S1a has a controlled circuit 11a connected between input 10a and a first node 10c, and is responsive to a switching signal at a first switching means control signal input 12a. A second controlled switch means S2b has a controlled circuit 11b connected between node 10c and input 10b, and is responsive to a switching signal at an associated control input 12b. A third controlled switch S2a has a controlled circuit 11c positioned between input 10a and a second node 10d, and is responsive to a switching signal at switching control signal input 12c. A fourth switch means S1d has a controlled circuit 11d connected between node 10d and input 10b, and is responsive to a signal at an associated control signal input 12d. A resonant power circuit 14 is connected between nodes 10c and 10d, and is here shown as a series/parallel resonant circuit, comprised of a series capacitance 16, a series inductance 18 and a parallel capacitance 20, in addition to the input total inductance of a transformer means 22 connected across parallel capacitor 20.

In accordance with the invention, transformer means 22 comprises a plurality N of transformer networks TN1–TNn, each having the primary windings thereof connected in series and with the entire series-connected set of primary windings connected across parallel capacitance 20. Each transformer means 22a, 22b, 22c, ..., 22n has its primary winding connected between associated first primary terminals 22a1, 22b1, 22c1, ..., 22n1 and second primary terminals 22a2, 22b2, 22c2, ..., 22n2. An associated "commutation-aiding" capacitance 24$j$ is connected in parallel with the primary winding of each transformer means 22$j$, where $1 \leq j \leq N$. While load-sharing is forced because all transformers have approximately the same primary current (forcing their secondary currents to be approximately equal), the shunting capacitors 24$j$ allow independent rectifier commutation. Thus, a first commutation-aiding capacitance 24$a$, of value $C_{p1}$, is connected between terminals 22$a$1 and 22$a$2. A second commutation-aiding capacitance 24$b$, of value $C_{p2}$, is connected between terminals 22$b$1 and 22$b$2. A third commutation-aiding capacitance 24$c$, of value $C_{p3}$, is connected between terminals 22$c$1 and 22$c$2. An n-th commutation-aiding capacitance 24$n$, of value $C_{pn}$, is connected between terminals 22$n$1 and 22$n$2. Current $i_{sj}$ is provided from the output 22$j$3 of each transformer network TN$j$ (e.g. respective currents $i_{s1}$, $i_{s2}$, $i_{s3}$, ..., $i_{sn}$ from respective outputs 22$a$3, 22$b$3, 22$c$3, ..., 22$n$3) and into a filter capacitance 26, of value $C_f$. The power converter output voltage $V_{out}$ is provided between output terminals 10$c$ and 10$d$; illustratively, for a positive-output converter, the negative output terminal 10$d$ is connected to converter ground potential. Thus, it is seen that the rectified high-frequency currents $i_{sj}$ from all transformer networks are combined in parallel.

If the total parallel resonant capacitance $C_p$ required for the series-parallel resonant converter network 14 is provided by the totality of the main parallel capacitance 20 and the plurality N of smaller capacitances $C_{pj}$, and if each of the load-sharing capacitances $C_{pj}$ are negligibly small, with respect to the magnitude $C_p$ of the single parallel capacitor 20, then the current $i_{pj}$ (e.g. currents $i_{p1}$, $i_{p2}$, $i_{p3}$, ..., $i_{pn}$) in each of the transformer primary windings will be equal to the current in all other transformer primary windings. If each transformer has a substantially identical turns ratio, when the current in (a) each of the transformer secondary windings, (b) the secondary winding rectifying network, and (c) the output current $i_{sj}$, are forced to be substantially equal in each transformer network TN$j$. In practice, some capacitance 24$j$ is required across each primary winding to provide a low impedance path to allow each secondary winding rectification means to commutatively switch in independent fashion. While this primary-paralleling capacitance somewhat reduces the assumption that each commutation-aiding capacitance $C_{pj}$ is negligibly small, so that the secondary currents are not exactly equal, the effect is negligible for all practical purposes if the capacitive impedance $X_{cj}(=\frac{1}{2}\pi F C_{pj}$, where F is the switching frequency) is larger than the impedance $R_j$ of the load reflected to the primary side of the transformer. It will be seen that the total of the main parallel capacitance $C_p$ and of all the series connected capacitances $C_{pj}$ must combine to give a resultant parallel capacitance $C_{tr}$ of value proper for the selected series/parallel resonant power network 14.

Figure 1B:
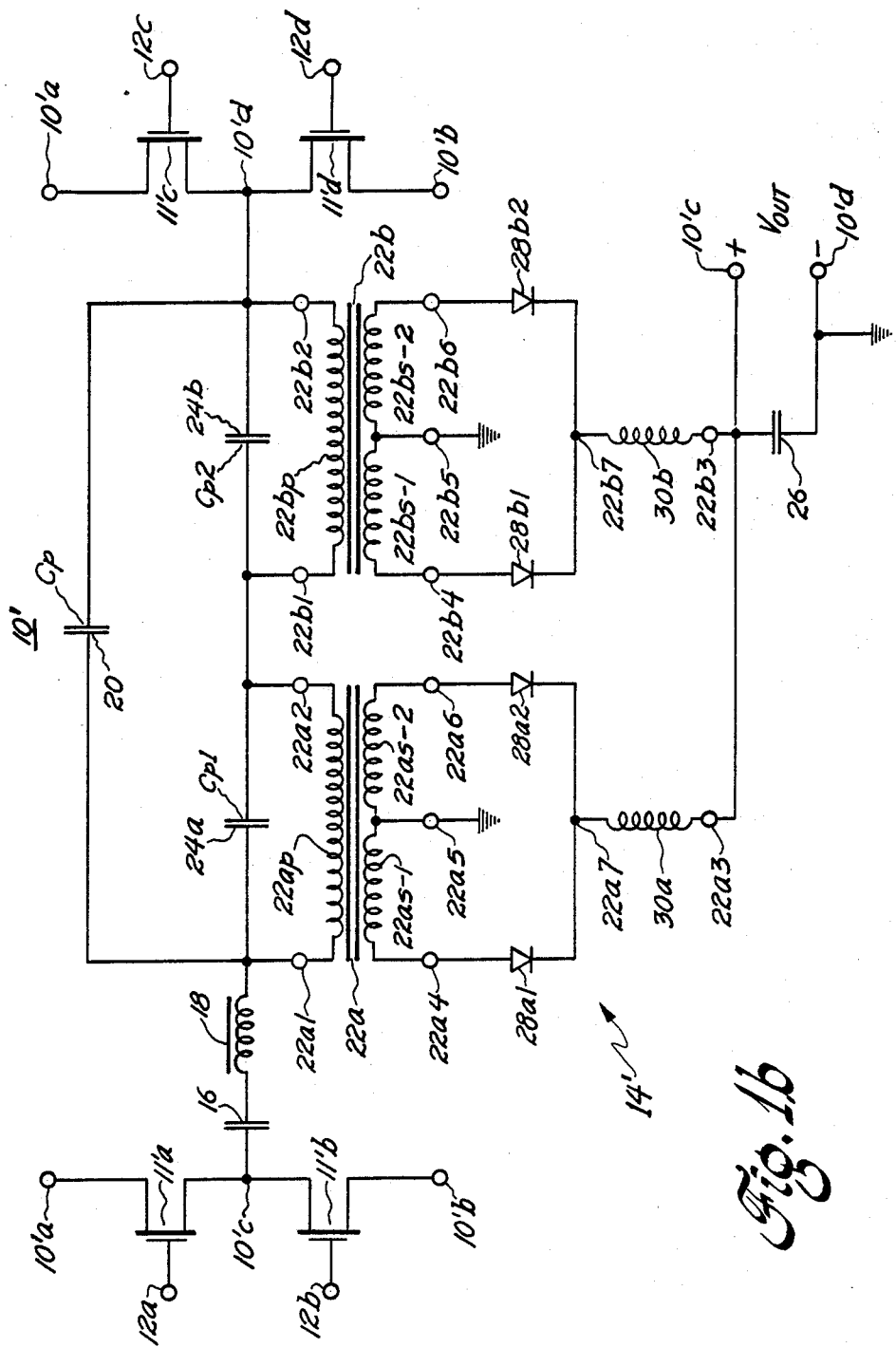
FIG. 1b is a schematic diagram of one presently preferred embodiment of a dual-transformer resonant power converter embodiment, in accordance with the principles of the present invention.

Referring now to FIG. 1$b$, a presently preferred embodiment of power converter 10″ utilizes a resonant power circuit 14′ in which two substantially identical lower-power transformer means 22$a$ and 22$b$ are used. Here, each of the four switching means 11′$a$-11′$d$ is a MOSFET power switching device, each controlled by the switching control signal provided to the respective one of gate electrodes 12$a$-12$d$. From breadboard measurements, we have determined that a reasonable capacitance split, for a practical design, is to have $C_{p1}=C_{p2}=C_p/3$. A 20 percent mismatch in load impedances still results in less than a two percent mismatch in output diode currents, with this capacitance split. Thus, capacitor 24$a$ is of substantially the same capacitance as capacitor 24$b$, and capacitor 20 is of a capacitance value three times that of capacitors 24$a$ and 24$b$.

Each transformer network 22 has a primary winding 22$ap$ or 22$bp$ connected between primary terminals 22$a$and 22$a$2 or 22$b$1 and 22$b$2. A pair of secondary windings 22$as$-1 and 22$as$-2 or 22$bs$-1 and 22$bs$-2 are coupled to the respective primary winding. The opposite ends of the series-connected pair of secondary windings are connected between terminal 22$a$4 and 22$a$6 or 22$b$4 and 22$b$6, with a transformer secondary winding center tap point 22$a$5 or 22$b$5 being connected to the converter common potential. Each of terminals 22$a$4, 22$a$6, 22$b$4 or 22$b$6 is connected to the anode of an associated one of unidirectionally-conducting (rectifier) means 28$a$1, 28$a$2, 28$b$1 or 28$b$2. The semiconductor diodes of the rectifier means are poled to provide positive voltages at transformer network intermediate nodes 22$a$7 or 2$b$7. Each of these nodes is connected through an associated filter inductance 30$a$ or 30$b$ to the associated transformer network output terminal 22$a$3 or 22$b$3, for connection to output filter capacitor 26 and the power converter output terminal 10′$c$, with respect to power converter common terminal 10′$d$. It will be seen that, by using a plurality N (here, N=2) of transformers, each of lower power rating than the total converter rating, each transformer 22 can be of a higher frequency design typical of the lower power level; the lower power transformer thus can be maintained at the same size, because operation now can occur at a high frequency. It will also be seen that scaling is such that the same transformer size results even though the primary voltage is only 1/N (e.g. one half for the circuit shown of FIG. 1$b$) that of a single transformer design. Illustratively, since the primary voltage in the illustrative circuit is one-half that of a single transformer converter, the primary current would have to double to maintain the same power. If the current is doubled, the wire size must double, although, since there are half as many primary winding turns, the total primary conductor volume remains the same. Further, because the primary turns are only half as great as in the higher-power/single-transformer version, the leakage inductance is only one-fourth of the leakage inductance encountered in a single transformer design, as leakage inductance is proportional to the square of the number of turns. The result is that there is the same loss as in the original single transformer design, because twice the current is commutated at half the voltage. Therefore, from a performance point of view, each of the transformers is the same as it would be for a single transformer design, even though each of the two transformers 22 is designed for half the primary voltage.

While one presently preferred embodiment of our novel resonant power converter with current sharing among multiple transformers has been described herein, many modifications and variations will now become apparent to those skilled in the art. It is our intent, therefore to be limited only by the scope of the appending claims and not by the details and instrumentalities presented by way of explanation of our presently preferred embodiment therein.

What we claim is:

1. A DC—DC power converter with a predetermined total power rating, comprising:

means for converting an input DC voltage to a single periodic AC voltage signal; and a plurality N of transformer networks, each with a power rating substantially only of 1/N-th of said total power rating, each having a primary winding connected in series with all other primary windings and with each primary winding receiving substantially 1/N-th of the single AC signal voltage, and each having a secondary means for commutating another AC signal voltage, each proportional to the AC signal voltage received by the primary winding of that transformer network, to obtain an output DC voltage from that transformer network; each secondary means being connected in parallel with, and having essentially the same output DC voltage as, all other transformer network secondary means and additively providing substantially 1/N-th of a total required output current; each transformer network including impedance means, coupled to the primary winding, for causing commutation in the associated secondary means to be substantially independent of commutation in the secondary means of all other transformer networks.

2. The power converter of claim 1, wherein the impedance means is a capacitive element connected in parallel across the associated primary winding.

3. The power converter of claim 2, wherein all capacitive elements have substantially the same capacitance value.

4. A DC—DC power converter with a predetermined total power rating, comprising:

means for converting an input DC voltage to a periodic AC voltage signal, including means for switching the input DC voltage between first and second nodes at the periodic signal frequency; and resonance circuit means, coupled between the first and second nodes, for providing the switched input DC voltage as the AC voltage signal; and a plurality N of transformer networks, each with a power rating substantially only of 1/N-th of said total power rating, each having a primary winding connected in series an receiving substantially 1/N-th of the AC signal voltage provided by said resonance circuit means, and each having a secondary means connected in parallel with, and having essentially the same output DC voltage as, all other transformer network secondary means and additively providing substantially 1/N-th of a total required output current; each secondary means including at least one secondary winding coupled to the primary winding; and means for rectifying the resulting AC voltage across the at least one secondary winding to obtain the output DC voltage for that transformer network; and each of the transformer networks including impedance means, coupled to the primary winding, for allowing commutation in the rectifying mean of each secondary means substantially independently of commutation in the rectifying means of all other secondary means.

5. The power converter of claim 4, wherein the impedance means is a commutation-aiding capacitive element in parallel connection across the associated primary winding.

6. The power converter of claim 5, wherein all commutation-aiding capacitive elements have substantially the same value of capacitance.

7. The power converter of claim 6, wherein the resonant circuit means includes another capacitive element connected in parallel across the series-connected plurality N of parallel commutation-aiding capacitive element and associated primary winding.

8. The power converter of claim 7, wherein the another capacitive element has a capacitance greater than the capacitance of any of the commutation-aiding capacitive elements.

9. The power converter of claim 8, wherein the another capacitive element has a capacitance on the order of three times as large as any of the commutation-aiding capacitive elements.

10. The power converter of claim 7, wherein the resonant circuit means is a series/parallel resonant circuit.

11. The power converter of claim 7, wherein the resonant circuit has at least one additional reactance element in series with the parallel subcircuit including said another capacitive element connected in parallel across the series connected plurality N of paralleled load-sharing capacitive element and associated primary winding.

12. The power converter of claim 11, wherein the additional reactance element comprises a series capacitive element connected in series with an inductive element.

* * * * *